United States Patent [19]
McGill

[11] Patent Number: 5,724,772
[45] Date of Patent: Mar. 10, 1998

[54] RESTRAINING CLAMP

[75] Inventor: Ted McGill, Cupertino, Calif.

[73] Assignee: Advanced Micro Devices, Inc., Sunnyvale, Calif.

[21] Appl. No.: 355,261

[22] Filed: Dec. 8, 1994

[51] Int. Cl.[6] ............................... E04F 19/00
[52] U.S. Cl. .................. 52/27; 248/237; 403/256; 403/261; 411/400; 52/713
[58] Field of Search ................ 52/27, 698, 263, 52/712, 713, 293.3; 411/383, 384, 400; 312/351.1, 223.3; 248/500, 501, 503, 503.1, 237, 224.4, 225.1, 188.4, 680; 405/256, 261, 262, 389, 391

[56] References Cited

U.S. PATENT DOCUMENTS

| 1,481,396 | 1/1924 | Ternes | 248/680 |
| 1,551,516 | 8/1925 | McGovern | 248/681 |
| 2,266,852 | 12/1941 | Gunningham | 248/681 |
| 3,631,646 | 1/1972 | Wollin | 52/713 |
| 4,038,801 | 8/1977 | Busch | 52/698 |
| 4,226,058 | 10/1980 | Riley | 52/27 |
| 4,545,167 | 10/1985 | Brock | 52/713 X |
| 4,614,070 | 9/1986 | Idland | 52/713 X |
| 4,978,097 | 12/1990 | Froutzis | 248/503.1 |
| 5,176,437 | 1/1993 | Remington | 312/351.1 |

Primary Examiner—Carl D. Friedman
Assistant Examiner—Beth Aubrey

[57] ABSTRACT

An article of furniture having legs, such as an industrial table, is restrained to a floor grid against seismic disturbances and accidental collisions. The restraint comprises a plate with elongated slots, which is secured at one end to a leg and, at the other end, to a bolt which is anchored to the bottom surface of the floor grid.

64 Claims, 4 Drawing Sheets

RESTRAINING CLAMP

TECHNICAL FIELD

The present invention relates to a restraining clamp, particularly for securing the leg of an article of furniture, such as an industrial table, to a floor grid, and to a method for securing a furniture leg to a floor grid.

BACKGROUND ART

Various types of buildings and structures, such as industrial facilities, manufacturing plants, research and development facilities, assembling plants and warehouses, contain various types of articles of furniture, such as tables, benches including work benches and desks, positioned on floors, typically made of metal and having a plurality of grid openings, usually generally polygonal in shape, such as generally square or generally rectangular openings. As shown in FIG. 1, a typical metal floor grid comprises a plurality of square sections, having a length 11 and width 12, of about 2 feet. The sections typically comprise a plurality of rectangular openings having a length 13, typically about 2 inches, and width 14, typically about ½ inch. Each corner of a section contains a screw hole 15 in which a screw is inserted to tightly secure the section in place. The metal floor grid shown in FIG. 1 is exemplary, as the size of the sections and grid openings may vary widely. For example, rectangular grid openings may be about 2 inches by about 2¾ inches, and grid openings may extend diagonally.

Typically, various buildings and structures having floors with a plurality of grid openings are equipped with various types of furniture, including tables, benches and desks, typically made of metal, such as stainless steel, having legs comprising a threaded portion extending from the bottom of the leg into a teflon base which sits upon the top surface of the floor grid. Industrial tables may range in size up to 8 feet in length and 4 feet in width, and are supported by four to eight legs about 30 inches long, and having a generally square shape, with a side of about 2 inches.

An extremely hazardous situation is created in industrial facilities having floor grids which support legged furniture, particularly in facilities where the furniture supports complex, delicate and/or heavy equipment. The hazardous situation stems, in part, from the presence of grid openings, particularly in metal floors, and the low functional force between the furniture legs, particularly those having a teflon base, and conventional metal floor grids. As a result of the low functional force, inadvertent or accidental collisions, as may occur during movement of equipment or when bumped by an individual, may result in costly equipment damage or serious personal injury. This hazardous situation is particularly acute in parts of the world periodically subject to seismic disturbances. This problem is particular vexing in the semiconductor industry, most particularly in California, wherein numerous intricate processing steps are carried out in the production of integrated circuits having critical dimensions measured in microns. Thus, virtually any disturbance to the furniture during processing can result in a costly rejection of semiconductor devices.

A prior attempt to solve this problem by restraining the furniture to withstand seismic disturbances and accidental collisions comprises securing the furniture legs to the floor grid with a wire clip. Such a prior technique is schematically shown in FIG. 2, wherein a conventional table leg with a threaded portion 21 extends into teflon base 22 which sits upon a conventional metal floor grid 23 having a thickness 24 of at least 1 inch and a plurality of grid openings 25. Threaded leg portion 21 of table leg 20 is adjustable by means of a washer 30a and nut 30b. In the prior restraining technique for securing the table legs to the metal floor grid, one end of wire clip 26 is initially tightly secured to the bottom surface of the metal floor grid by means of washer 27 and nut 28. The other end of the wire clip is subsequently secured to the threaded portion of leg 21 by upper washer 28a and upper nut 28b, and lower washer 29a and lower nut 29b. The enlarged segment in FIG. 2 shows a top view of metal clip 26, typically of stainless steel.

The prior restraining system depicted in FIG. 2 suffers from several disadvantages. Specifically, the prior restraining system is extremely expensive and time consuming to install due, in part, to the necessity of taking up the floor grid so that the metal clip can be attached to the bottom surface of the floor grid. Moreover, during installation while the floor grid is taken up, an extremely hazardous situation is presented. Accordingly, there is a manifest need for a restraining clamp which is capable of securing furniture legs to a floor grid to effectively restrain the furniture to withstand seismic disturbances and collisions in an efficient, inexpensive manner without generating a hazardous situation.

DISCLOSURE OF THE INVENTION

An object of the present invention is a restraining clamp for securing furniture legs to a floor grid.

Another object of the invention is a method for efficiently securing furniture legs to a floor grid.

Additional objects, advantages and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

According to the present invention, the foregoing and other objects are achieved in part by a restraining clamp comprising a plate having first and second openings, and a bolt comprising a generally linear shaft having a threaded portion extending to at least a first end thereof and an anchoring leg extending at an angle from the other end.

Another aspect of the invention is the combination of a floor grid, an article of furniture having legs, and a clamping device, wherein the clamping device, which comprises a plate having first and second openings, is secured to the floor grid by a bolt having a generally linear shaft with a threaded portion extending at least to a first end thereof, and an anchoring leg extending at an angle from the other end of the bolt shaft, wherein the anchoring leg tightly engages the bottom surface of the floor grid and the bolt is secured to the floor grid by a nut and washer on the top surface of the floor grid, and the first end of the shaft is tightly secured within the first opening of to the plate, and a furniture leg is tightly secured within the second opening of the plate.

A further aspect of the invention is a method of securing a furniture leg to a grid floor with a clamping means comprising: providing means for restraining the legs comprising a plate having first and second openings and a bolt comprising a generally linear shaft having a threaded portion extending to at least a first end thereof and an anchoring leg extending at an angle from the other end; inserting the anchoring leg through a grid opening so that the anchoring leg engages the bottom surface of the floor and the threaded portion of the bolt shaft extends above the top surface of the floor; tightly engaging the threaded portion of the bolt shaft to the top surface of the floor leaving part of the threaded portion of the bolt shaft extending above the top surface of the floor; tightly engaging the threaded portion of the bolt shaft within the first opening of the plate; and tightly engaging the leg within the second opening of the plate.

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
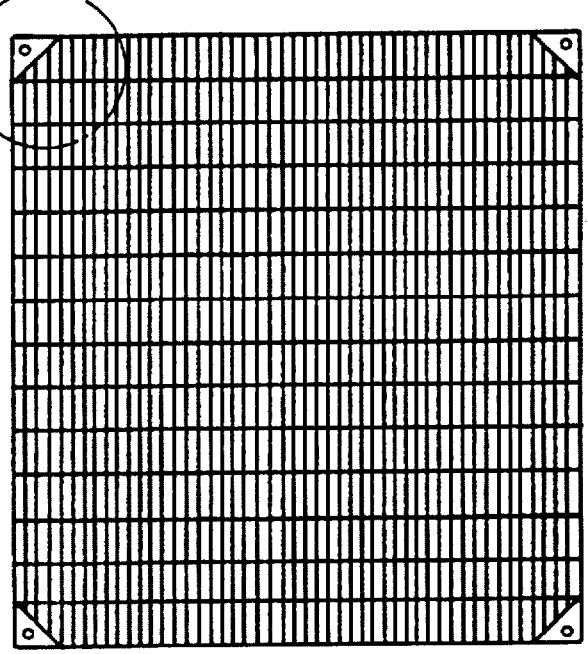
FIGS. 1 and 1(a) are top views of a conventional metal floor grid.
Figure 1A:
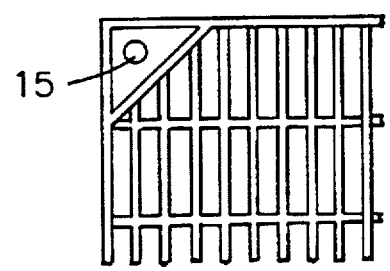

The present invention is directed to a restraining clamp for securing an article of furniture having legs to a floor having a plurality of grid openings, thereby preventing injuries to individuals and damage to equipment on the furniture during seismic disturbances or upon accidental collision. The restraining clamp of the present invention is designed so that it can be easily, efficiently, inexpensively, and effectively installed in existing facilities without requiring any modification to existing floors or furniture, or generating a hazardous situation during or after installation.

The restraining clamp of the present invention comprises a plate having first and second openings and a bolt having an anchoring leg. The bolt with anchoring leg is capable of being readily inserted through a grid opening so that the anchoring leg of the bolt can be secured to the bottom surface of the grid floor, as by means of tightly securing the bolt to the top surface of the grid floor. The bolt comprises a shaft having a threaded portion extending to at least a first end and, preferably an unthreaded portion at the other end from which the anchoring leg extends at an angle. The threaded portion of the bolt shaft is tightly secured to the top surface of the floor grid thereby tightly engaging the anchoring leg to the bottom surface of the floor grid. The threaded portion of the bolt shaft is then tightly engaged within the first opening of the plate, and a threaded leg portion of a conventional furniture leg tightly engaged within the second opening of the plate. In a preferred embodiment, the first and second openings in the plate comprise first and second elongated slots extending inwardly from opposite edges of the plate. In this manner, conventional legged furniture can be quickly, economically, efficiently, and effectively restrained to a floor grid in existing facilities without generating a hazardous situation during installation.

It should be readily apparent that the dimensions of the components of the restraining clamp may vary depending upon the dimensions of the legged furniture and floor grid, and furniture legs to be secured.

The plate of the restraining clamp preferably has a top surface, a bottom surface, and a generally polygonal shape with at least two opposing edges. The plate preferably has a generally square shape, most preferably a generally rectangular shape. In a preferred aspect of the present invention, an elevated ridge extends above the top surface of the plate along each of two opposite edges. When the restraining clamp is installed, the elevated ridges provide an additional measure of safety by resisting disconnection of the plate.

Preferably, the first and second inwardly extending elongated slots are provided at the same opposite edges on which the elevated ridges extend. In a preferred aspect of the invention, the plate has a generally rectangular shape, with the elevated ridges and elongated slots on the opposite shorter edges. The dimensions of the elevated ridges and elongated slots, as well as the plate itself, depend upon the size of the furniture leg and dimensions of floor grid to be secured. The preferred generally rectangular plate can have a length up to, for example, about 5 inches, preferably about 3 inches, and a width of about 1¼ inches. The elevated ridges generally extend up to about 1 inch from the top surface of the plate, depending upon the particular application, preferably about ¼ inch above the top surface of the plate. The first and second inwardly extending elongated slots are preferably of different lengths and thicknesses, the particular dimensions depending upon the size of the furniture leg and dimensions of the floor grid to which the furniture leg is to be secured. In the above-mentioned preferred generally rectangular plate having a length of about 3 inches, the length and width of the first elongated slot are less than the length and width of the second elongated slot. Preferably, the first elongated slot has a length of about 1 inch and a width of about ⅛ inch, and the second elongated slot has a length of about 1¼ inch and a width of about ½ inch.

The restraining clamp of the present invention also comprises a bolt having a generally linear shaft, preferably with a threaded portion extending to the first end of the shaft, and a non-threaded portion at the opposite end of the shaft. An anchoring leg extends from the non-threaded portion of the shaft at an angle of up to about 90½, preferably about 75½ to about 90½. In one embodiment, the anchoring leg extends from the non-threaded portion of the shaft at an angle of about 90½, while in other embodiments the anchoring leg extends at an angle of 75½ to less than 95½, such as 75½ to 85½ from the non-threaded portion of the shaft, to facilitate insertion through a grid opening and anchoring at the bottom surface of the floor by penetrating upwardly into a grid opening. The dimensions of the bolt, i.e., shaft, anchoring leg, and angle, depend upon the dimensions of the floor grid. The dimensions of the shaft, anchoring leg, and angle, are selected so that the anchoring leg can be easily inserted through a grid opening from the top surface to enable the anchoring leg to the secured bottom surface of the floor. The shaft of the bolt preferably has a length in excess of about 2½ inches when securing a furniture leg to a floor grid having a thickness greater than about 1 inch. The length of the anchoring leg depends upon the size of the grid opening through which it is inserted. Generally, the anchoring leg should be of sufficient length so that it can be securely anchored on the bottom portion of the floor without slippage. Typically, when securing a furniture leg to a rectangular grid opening of about 2 inches×about 1 inch, a floor grid having an anchoring leg having a length of about ¾ inch is sufficient. The bolt shaft is provided in any suitable diameter, as for example, up to about ½ inch, preferably about ¼ inch. Both the bolt and the plate are preferably made of a metal having sufficient strength and ductility, such as a steel, most preferably a stainless steel. However, the bolt and plate can be made of a plastic material, preferably a high strength plastic material.

The restraining clamp of the present invention also comprises means for tightly engaging the bolt to the floor and to the plate, and for tightly engaging the plate to the furniture leg. Such means can comprise any suitable conventional means, such as a nut and washer combination.

The plate employed in the inventive restraining clamp, which is preferably made of a stainless steel, can be formed by any of various conventional techniques, such as casting, stamping and/or machining. The bolt, which is also preferably made of stainless steel, can also be made by conventional techniques. For example, a rod of selected diameter can be threaded over its entire length and then bent at one end at an appropriate angle, e.g., between 75½ and 90½ to provide the anchoring leg. This embodiment affords the anchoring leg with a roughened surface, by virtue of the threads, to enhance gripping of the floor grid. In another embodiment, a rod can be partially threaded to one end, and the other end bent at an appropriate angle to provide the anchoring leg. The intended gripping surface of the anchoring leg can also be roughened to enhance gripping the floor grid.

The furniture leg and floor to which the furniture leg is to be secured by the inventive restraining clamp can be any of those conventionally available and/or presently in existing facilities. Thus, the present restraining clamp can be advantageously installed in existing facilities without any major renovations, down time, or creation of a hazardous situation. Typical industrial furniture includes tables, benches, and desks. Tables in industrial facilities can, for example, have a length up to about 8 feet and a width up to about 3 feet, and can have four to eight legs, with a generally square cross-section and sides of about 2 inches, each leg having a length up to about 34 inches. Typically, a threaded portion or a screw extends from the end of each leg into a teflon base. The screw extends from the end of each leg via a nut and washer, so that the screw can be extended and withdrawn to enable levelling of the furniture surface.

Figure 3:
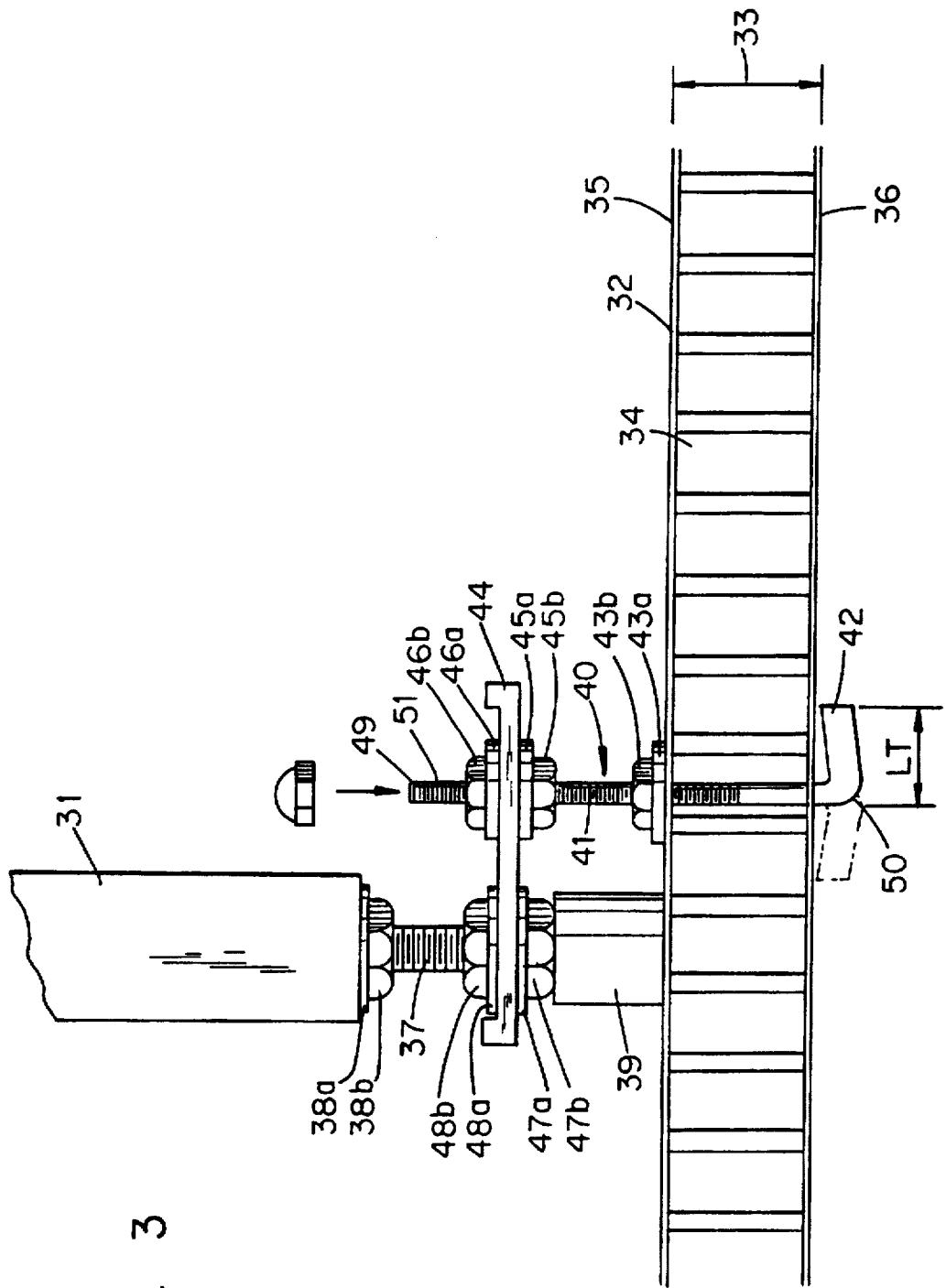
FIG. 3 schematically illustrates an embodiment of the clamping device of the present invention.
Figure 4:
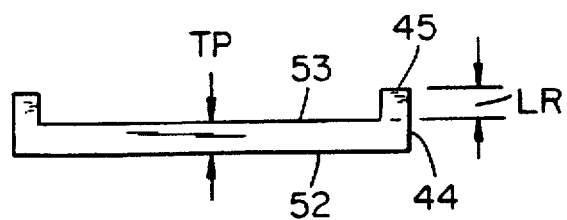
FIG. 4 is a side view of the plate employed in the FIG. 3 embodiment.
Figure 5:
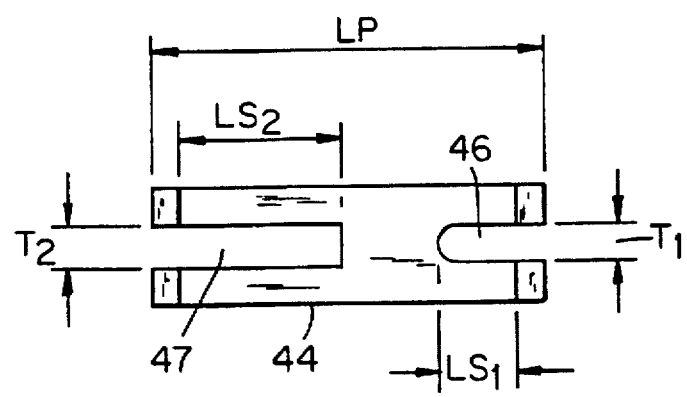
FIG. 5 is a top view of the plate employed in the FIG. 3 embodiment.

FIGS. 3 through 5 schematically depict an embodiment of the present invention, wherein the restraining clamp secures a conventional table leg to a conventional metal floor grid. With reference to FIG. 3, table leg 31 is secured, with respect to seismic disturbances and accidental collision, to metal floor grid 32 by means of the restraining clamp of the present invention. Metal floor grid 32 is a conventional metal floor grid having a thickness 33 of at least about 1 inch and a plurality of grid openings 34 extending through its thickness from top surface 35 to bottom surface 36. A threaded portion or screw 37 extends from the end of table leg 31, via washer 38a and nut 38b, into teflon base 39 which sits on the top surface 35 of metal floor grid 32. Due to the small frictional force between teflon base 39 and the top surface 35 of the metal floor grid 32, a hazardous situation exists placing equipment and personnel in danger as a result of an accidental collision or a seismic disturbance. This is particularly true of the semiconductor industry in California wherein seismic disturbances are not uncommon.

One component of the inventive restraining clamp is bolt 40, which comprises an elongated generally linear shaft 41, preferably having a threaded portion 51 extending to the first end 49, and a non-threaded portion at the opposite end from which an anchoring leg 42 extends at an angle. Although, anchoring leg 42 can extend from the bolt shaft at an angle of 90½, the FIG. 3 embodiment depicts the angle at less than 90½ so that the end of anchoring leg 42 extends into a grid opening at the bottom surface 36 of the metal floor grid for secure engagement. The length of the terminal portion LT depends upon the size of grid opening 34. In the FIG. 3 embodiment, a length LT of approximately ¾ inch is sufficient.

Figure 2:
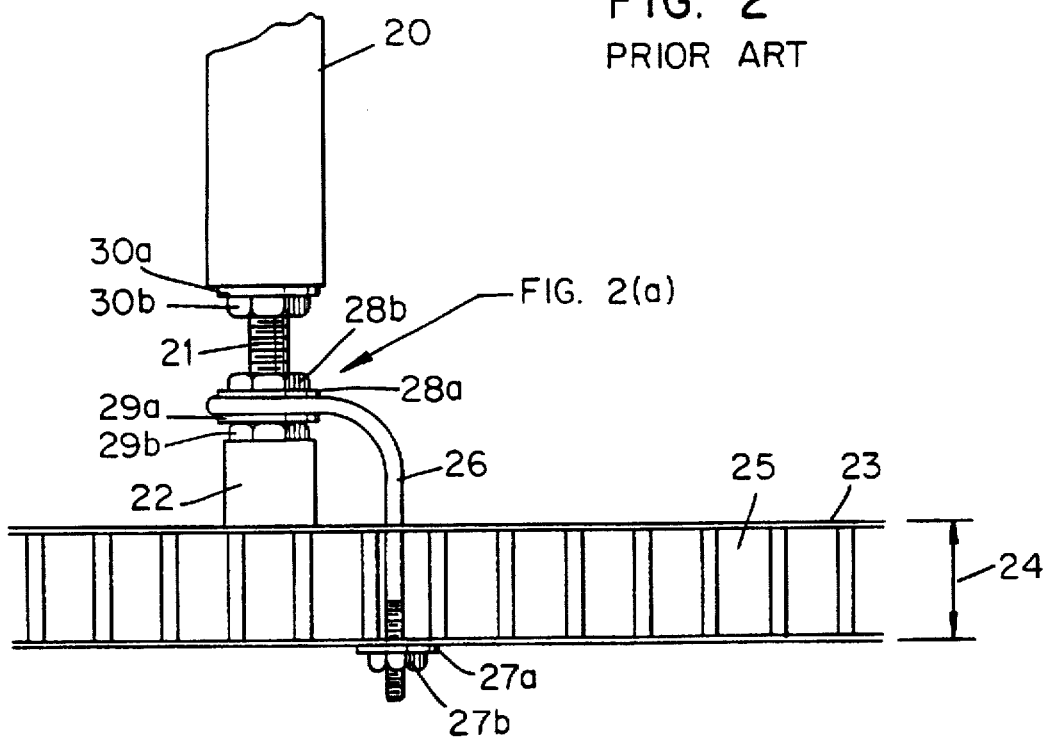
FIGS. 2 and 2(a) schematically illustrate a prior art technique for securing a table leg to a metal floor grid.
Figure 2A:
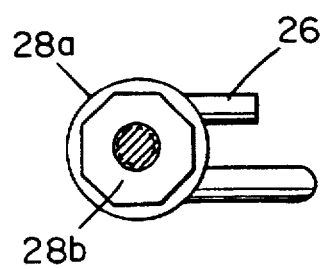

After bolt 40 is passed through a grid hole and the anchoring leg engaged in a grid opening at the bottom surface of the metal floor grid, the threaded portion 51 of shaft 41 is tightly engaged to the top surface of metal floor grid, thereby tightly engaging anchoring leg 42 to the bottom surface 36 of metal floor grid 32. This is conveniently effected by means of a washer 43a and nut 43b on the top surface 34 of the metal floor grid. Thus, at this point, the dramatic improvement of the present invention over the conventional systems shown in FIG. 2 is apparent, in that the bolt is simply inserted through an existing grid opening in the metal floor grid and anchored to the undersigned by anchoring leg 42, without the necessity of disturbing or taking up the metal floor grid. Therefore, the time consuming and expensive installation procedure of the prior system shown in FIG. 2, which includes taking up the metal floor grid, is avoided.

After bolt 40 is tightly secured to metal floor grid 32, the threaded portion of bolt shaft 41 is tightly engaged within first elongated slot 46 (shown in FIG. 5) of plate 44 with washer 45a and nut 45b, and washer 46a and nut 46b, at the bottom 52 and top 53 at surfaces (shown in FIG. 4) of plate 44, respectively.

As shown in FIGS. 4 and 5, plate 44 has a generally rectangular shape with a length LP depending upon a particular application. With respect to the exemplified embodiment of FIG. 3, length LP is about 3 inches while the thickness TP of plate is about ¼ inch. The width of plate 44 is about 1¼ inches. Plate 44 preferably comprises elevated ridges 45 extending along the width edges above the top surface a distance LR, preferably about ¼ inch. Elevated ridges 45 maintain plate 44 in place and resist dislodgement.

Plate 44 also comprises first 46 and second 47 elongated slots extending inwardly from the width edges. Preferably, elongated slots 46 and 47 do not have the same length and width as shown. First elongated slot 46 preferably has a length LS to the elevated ridge 45 of about ¾ inch for a total length of about 1 inch, while second elongated slot 47 preferably has a length LS2 extending inwardly from elevated ridge 45 of about 1 inch for a total length of about 1¼ inches. First elongated slot 46 has a width of about ⅛ inch, while second elongated slot 47 has a width of about ½ inch.

Adverting to FIG. 3, after shaft 41 is tightly engaged within first elongated slot 46 of plate 44, the threaded portion of the table leg 31 is tightly engaged within second elongated slot 47 of plate 44 with washer 47a and nut 47b, and washer 48a and nut 48b, at the top and bottom surfaces of plate 44, respectively.

In situations wherein metal furniture is restrained to a metal floor grid employing the present restraining clamp, it is preferred to employ a metal plate and metal bolt to achieve the advantage of grounding and eliminating the necessity of a separate grounding wire. This advantage is notably apparent in the electronics and semiconductor industry, wherein detrimental static electricity accumulates on the surfaces of metallic furniture. By employing a restraining clamp of metal components, a convenient discharge path or ground to the metal floor is provided without an extraneous wire.

The present invention is not limited to the particular types of furniture mentioned or to the particular dimensions of the plate and bolt exemplified. It should be apparent that the particular dimensions depend upon the geometry and dimensions of the floor grid and furniture leg to be secured. Although washer and nut means are disclosed for effecting tight engagement, it should be apparent that other conventional tightening means can be employed.

The present invention provides an economical efficient, and effective way to restrain furniture to a floor grid in industrial facilities without requiring any modification of the furniture or floor grid, and without any removal of the metal floor grid and attendant cost, downtime and hazards. The restraining clamp of the present invention can be provided in any suitable dimension, to effect restraint of furniture in existing facilities.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

I claim:

1. In combination:
   (i) an article of furniture having legs;
   (ii) a floor having a plurality of grid openings, a top surface on which the legs stand and a bottom surface; and
   (iii) an element for restraining the legs comprising:
      (a) a plate having first and second openings; and
      (b) a bolt comprising a generally linear shaft having a threaded portion extending to at least a first end thereof and an anchoring leg extending at an angle from a second end; wherein,
      the bolt extends through one of the grid openings in the floor with the anchoring leg tightly engaging the bottom surface of the floor, the first end of the bolt shaft extends through the grid opening above the top surface of the floor and is tightly engaged to the floor at the top surface, the threaded portion of the bolt is tightly engaged within the first opening of the plate, and the table leg is tightly engaged within the second opening of the plate.

2. The combination according to claim 1, wherein the plate has a generally polygonal shape, a top surface, a bottom surface, and at least two opposite edges, an elevated ridge extending above the top surface along each opposite edge, and the first and second openings are first and second elongated slots extending inwardly from each opposite edge; and wherein the bolt comprises a shaft having a threaded portion extending to the first end thereof, and a non-threaded portion at the second end thereof, with the anchoring leg extending at an angle from the second end of the shaft.

3. The combination according to claim 2, wherein the plate comprises a metal or a plastic material.

4. The combination according to claim 3, wherein the plate comprises a stainless steel.

5. The combination according to claim 2, wherein the bolt comprises a metal or a plastic material.

6. The combination according to claim 5, wherein the bolt comprises a stainless steel.

7. The combination according to claim 2, wherein the threaded portion of the bolt shaft is tightly engaged to the top surface of the floor by a nut and washer.

8. The combination according to claim 2, wherein the threaded portion of the bolt shaft is tightly engaged within the first elongated slot of the plate by a nut and washer.

9. The combination according to claim 8, wherein the threaded portion of the bolt shaft is tightly engaged within the first elongated slot of the plate by a nut and washer on the top surface of the plate and a nut and washer on the bottom surface of the plate.

10. The combination according to claim 2, wherein one of the legs of the furniture comprises a threaded portion which is tightly engaged within the second elongated slot of the plate.

11. The combination according to claim 10, wherein the threaded portion of the leg is tightly engaged within the second elongated slot by a nut and washer.

12. The combination according to claim 11, wherein the threaded portion of the leg is tightly engaged within the second elongated slot of the plate of a nut and washer on the top surface of the plate and a nut and washer on the bottom surface of the plate.

13. The combination according to claim 2, wherein each elevated ridge extends to a height up to about 1 inch above the top surface of the plate.

14. The combination according to claim 13, wherein each elevated ridge extends to a height about ¼ inch above the top surface of the plate.

15. The combination according to claim 2, wherein the first and second elongated slots have different lengths and different widths.

16. The combination according to claim 15, wherein the first elongated slot is shorter and wider than the second elongated slot.

17. The combination according to claim 2, wherein the plate has a generally square shape.

18. The combination according to claim 2, wherein the plate has a generally rectangular shape and the elevated ridges and slots extend from the shorter edges of the plate.

19. The combination according to claim 18, wherein the plate has a length of up to about 5 inches and a width of up to about 2½ inches.

20. The combination according to claim 19, wherein the plate has a length greater than about 3 inches and a width of about 1¼ inches.

21. The combination according to claim 20, wherein the first elongated slot extends inwardly a distance of about 1 inch and has a width of about ⅜ of an inch, and the second elongated slot extends inwardly a distance of about 1¼ inches and has a width of about ½ inch.

22. The combination according to claim 2, wherein the floor has a thickness of up to about 5 inches.

23. The combination according to claim 22, wherein the floor has a thickness of about 1 inch.

24. The combination according to claim 2, wherein the grid openings have a generally polygonal shape.

25. The combination according to claim 24, wherein the grid openings have a generally square shape.

26. The combination according to claim 24, wherein the grid openings have a generally rectangular shape.

27. The combination according to claim 26, wherein the grid opening has a length up to about 3 inches.

28. The combination according to claim 27, wherein the grid opening has a length of about 2 inches and a width of about ½ inch.

29. The combination according to claim 28, wherein the anchoring leg has a length of about ¾ inch.

30. The combination according to claim 2, wherein the anchoring leg extends from the non-threaded portion of the bolt shaft at an angle of about 90½.

31. The combination according to claim 2, wherein the anchoring leg extends from the non-threaded portion of the bolt shaft at an angle of about 75½ to about 85½.

32. The combination according to claim 2, wherein the article of furniture is a table.

33. The combination according to claim 2, wherein the article of furniture is a bench.

34. The combination according to claim 2, wherein the article of furniture is a desk.

35. A method for restraining an article of furniture having legs to a floor having a top surface, a bottom surface, and a plurality of grid openings, which method comprises:

providing an element for restraining the legs comprising:
   (a) a plate having first and second openings; and
   (b) a bolt comprising a generally linear shaft having a threaded portion extending to at least a first end thereof and an anchoring leg extending at an angle from a second end;

inserting the anchoring leg through a grid opening so that the anchoring leg engages the bottom surface of the floor and the threaded portion of the bolt shaft extends above the top surface of the floor;

tightly engaging the threaded portion of the bolt shaft to the top surface of the floor leaving part of the threaded portion of the bolt shaft extending above the top surface of the floor;

tightly engaging the threaded portion of the bolt shaft within the first opening of the plate; and tightly engaging the leg within the second opening of the plate.

36. The method according to claim 35, wherein the plate has a generally polygonal shape, a top surface, a bottom surface, and at least two opposite edges, an elevated ridge extending above the top surface along each opposite edge, and the first and second openings are first and second elongated slots extending inwardly from each opposite edge; and wherein the bolt comprises a shaft having a threaded portion extending to the first end thereof, and a non-threaded portion at the second end thereof, with the anchoring leg extending at an angle from the second end of the shaft.

37. The method according to claim 36, further comprising applying a cap nut to the first end of the threaded portion of the bolt shaft.

38. The method according to claim 36, further comprising tightly engaging the threaded portion of the bolt shaft to the top surface of the floor with a nut and washer.

39. The method according to claim 36, further comprising tightly engaging the threaded portion of the bolt shaft within the first elongated slot of the plate with a nut and washer.

40. The method according to claim 39, further comprising tightly engaging the threaded portion of the bolt shaft within the first elongated slot of the plate with a nut and washer on the top surface of the plate and with a nut and washer on the bottom surface of the plate.

41. The method according to claim 36, wherein the leg comprises a threaded portion and, which method further comprises tightly engaging the threaded portion of the leg within the second elongated slot of the plate.

42. The method according to claim 41, further comprising tightly engaging the threaded portion of the leg within the second elongated slot with a nut and washer.

43. The method according to claim 42, further comprising tightly engaging the threaded portion of the leg within the second elongated slot of the plate using a nut and washer on the top surface of the plate and a nut and washer on the bottom surface of the plate.

44. The method according to claim 36, wherein the article of furniture is a table.

45. The method according to claim 36, wherein the article of furniture is a bench.

46. The method according to claim 36, wherein the article of furniture is a desk.

47. A restraining clamp for restraining an article of furniture having legs to a floor comprising a plurality of grids, which restraining clamp comprises:
   (a) a horizontal plate having first and second openings; and
   (b) a bolt comprising a generally linear shaft having a threaded portion extending to at least a first end thereof and an anchoring leg extending at an angle from a second end, wherein the anchoring leg is integrally formed by bending the second end of the linear shaft.

48. A restraining clamp for restraining an article of furniture having legs to a floor comprising a plurality of grids, which restraining clamp comprises:
   (a) a plate having first and second openings; and
   (b) a bolt comprising a generally linear shaft having a threaded portion extending to at least a first end thereof and an anchoring leg extending at an angle from a second end, wherein the plate has a generally polygonal shape, a top surface, a bottom surface, and at least two opposite edges, an elevated ridge extending above the top surface along each opposite edge, and the first and second openings are first and second elongated slots extending inwardly from each opposite edge; and wherein the bolt comprises a shaft having a threaded portion extending to the first end thereof, and a non-threaded portion at the second end thereof, with the anchoring leg extending at an angle from the second end of the shaft.

49. The restraining clamp according to claim 48, further comprising a cap nut.

50. The combination according to claim 2, further comprising a cap nut.

51. The restraining clamp according to claim 48, wherein the plate comprises a metal or a plastic material.

52. The restraining clamp according to claim 48, wherein the plate comprises a stainless steel.

53. The restraining clamp according to claim 48, wherein the bolt comprises a metal or a plastic material.

54. The restraining clamp according to claim 48, wherein the bolt comprises a stainless steel.

55. The restraining clamp according to claim 48, wherein each elevated ridge extends to a height up to about 1 inch above the top surface of the plate.

56. The restraining clamp according to claim 55, wherein each elevated ridge extends to a height of about ¼ inch above the top surface of the plate.

57. The restraining clamp according to claim 48, wherein the first and second slots have different lengths and different widths.

58. The restraining clamp according to claim 48, wherein the first elongated slot is shorter and wider than the second elongated slot.

59. The restraining clamp according to claim 48, wherein the plate has a generally square shape.

60. The restraining clamp according to claim 48, wherein the plate has a generally rectangular shape and the elevated ridges and elongated slots extend from the shorter edges.

61. The restraining clamp according to claim 60, wherein the plate has a length up to about 5 inches and a width of up to about 2½ inches.

62. The restraining clamp according to claim 61, wherein the plate has a length greater than about 3 inches and a width of about 1¼ inches.

63. The restraining clamp according to claim 48, wherein the first elongated slot extends inwardly a distance of about 1 inch and has a width of about ⅛ of an inch, and the second elongated slot extends inwardly a distance of about 1¼ inches and has a width of about ½ inch.

64. The restraining clamp according to claim 48, further comprising a plurality of nuts and washers.

* * * * *

UNITED STATES PATENT AND TRADEMARK OFFICE
CERTIFICATE OF CORRECTION

PATENT NO. : 5,724,772
DATED     : March 10, 1998
INVENTOR(S) : Ted MCGILL

It is certified that error appears in the above-indentified patent and that said Letters Patent is hereby corrected as shown below:

In Claim 30, line 3, "$90_{1/2}$", should read --90°--.
In Claim 31, line 3, "$75_{1/2}$", should read --75°--.
In Claim 31, line 3, "$85_{1/2}$", should read --85°--.

Signed and Sealed this

Twenty-fifth Day of August, 1998

Attest:

BRUCE LEHMAN

*Attesting Officer*   *Commissioner of Patents and Trademarks*